ELECTRONIC ORGAN

Original Filed May 16, 1958 3 Sheets-Sheet 1

Inventor
Richard H. Peterson
By Donald H. Sweet
Attorney

ELECTRONIC ORGAN

Original Filed May 16, 1958 3 Sheets-Sheet 2

Inventor
Richard H. Peterson
By Donald H. Sweet
Attorney

Inventor
Richard H. Peterson
By Donald H. Sweet
Attorney

United States Patent Office

Re. 25,515
Reissued Jan. 21, 1964

25,515
ELECTRONIC ORGAN

Richard H. Peterson, Oak Lawn, Ill.

Original No. 3,038,365, dated June 12, 1962, Ser. No. 735,854, May 16, 1958. Application for reissue July 20, 1962, Ser. No. 213,568
22 Claims. (Cl. 84—1.26)

Matter enclosed in heavy brackets [ ] appears in the original patent but forms no part of this reissue specification; matter printed in italics indicates the additions made by reissue.

My invention relates to electronic musical instruments of the organ type. It includes among its objects and advantages a transistor oscillator capable of extremely prolonged decay without undesirable transistory sound effects. It also includes player-controlled percussion effects variable over a wide range. It also includes the peculiar transistory percussion effect commonly produced by piano strings or by chime bars equipped with felt dampers. Further objects and advantages will become apparent as the description proceeds.

Figure 1:
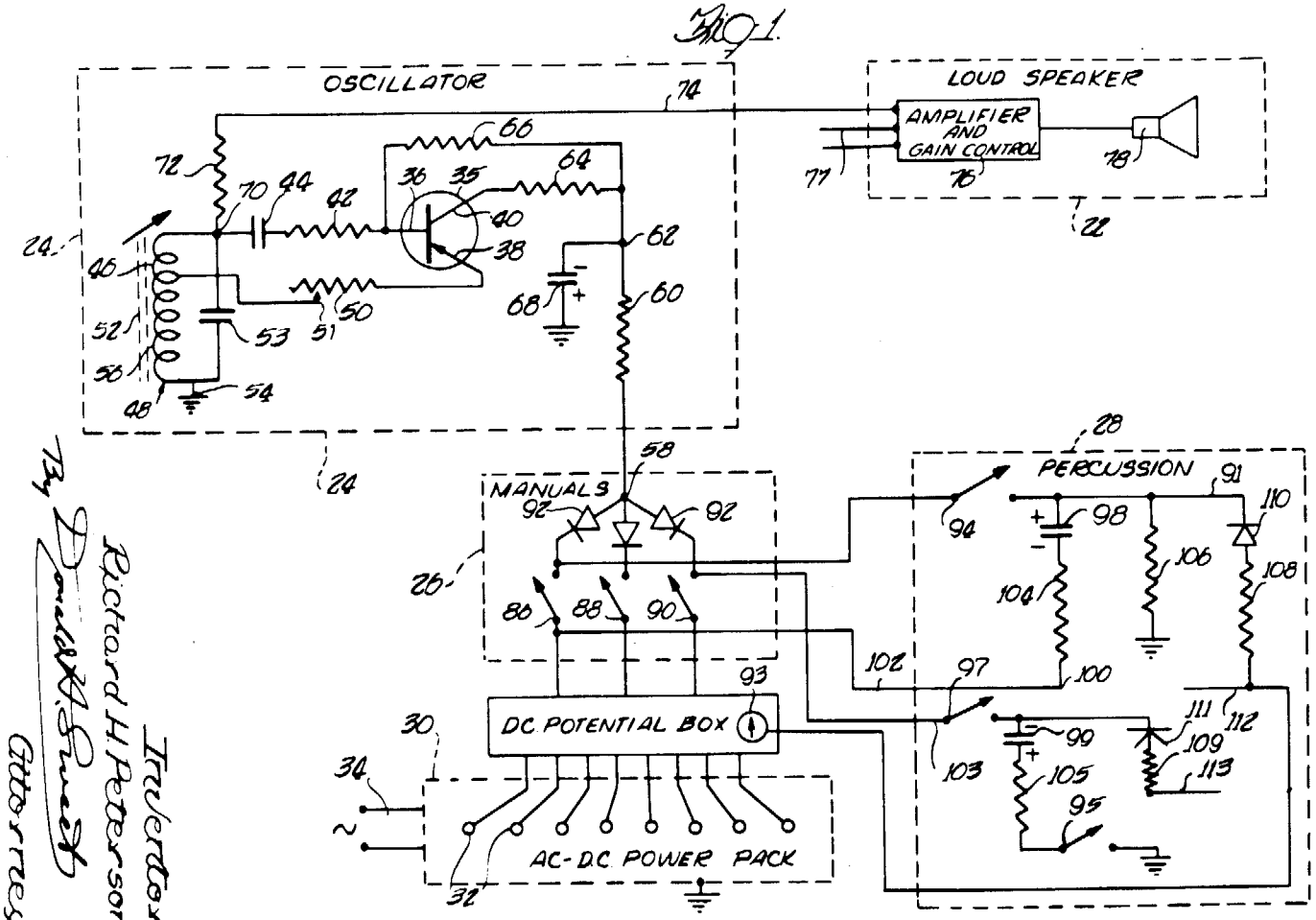
FIGURE 1 is a schematic wiring diagram of an oscillator and accessories according to the invention.

In the embodiment selected to illustrate the invention, the organ itself may comprise a conventional console having a solo manual 10, and accompaniment manual 12, and a pedal board 14, assembled in a conventional geometrical relationship. There is also an expression control pedal 16 and a tremolo rotor 18. Behind the pedal board 14, I have indicated twelve different tone generator chasses 20. The chasses illustrated is according to my co-pending application, S.N. 598,582, filed July 18, 1956, now Patent Number 2,924,784. Due to the exceptionally small volume occupied, it is possible to house seventy-two oscillators assembled in twelve groups of six each within the shallow space occupying about 32 percent of the rear side of the casing and about 25 percent of the depth of the casing, behind the pedal board 14.

Figure 3:
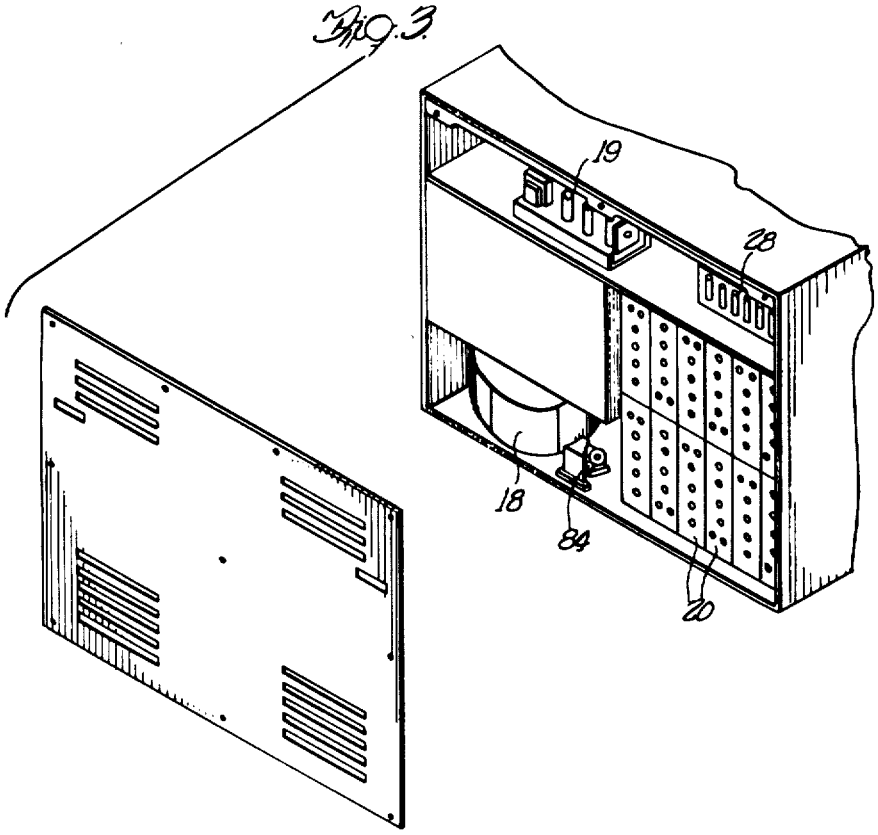
FIGURE 3 is a similar view of the rear side only of the same organ.

This extreme reduction in the volume occupied makes it possible to include within the confines of a conventional spinet body, not only the entire generator equipment, and electronic accessories, but an entire loud speaker 78 and an enclosure 80 for it for securing the correct acoustics, and a tremolo rotor 18 for delivering the sound. In FIGURE 3, there is also indicated the location of the power amplifier 19, and the percussion unit 28.

Referring now to FIGURE 1, it is convenient to discuss the wiring shown in four subdivisions, comprising the amplifier unit 22, the oscillator 24, the manual control 26, and the unit 28. This unit 28 provides unique and desirable percussion and reverberation effects. It is hereinafter identified, for brevity only, as the percussion unit. There is also a power source 30 provided with a plurality of voltage taps 32. In this specific embodiment, the source 30 may receive 60 cycle alternating current through supply cables 34 and deliver predetermined selected D.C. potential, as selected from time to time by the player, to the various terminals and buses of the entire organ. The voltages employed in practice at present vary in steps of three volts each from plus 3 volts to minus 27 volts. As the details of transforming 120 volts 60 cycle A.C. into D.C. at various voltages are well known in the art and may be conventional, this description is not encumbered therewith.

The transistor 35 is of the PNP type usually employed for audio-frequency work. It has a base connection at 36, an emitter connection at 38, and a collector connection at 40. The connection 36 and 38 are part of an exciting loop running from the base 36 through a base resistor 42, a base capacitor 44, a minor upper fraction 46 of the winding 48, and an emitter resistor 50 back to the emitter 38.

The winding 48 is physically associated with a ferromagnetic core 52 of ceramic material, as described in my co-pending application, S.N. 598,582, filed July 18, 1956, now Patent Number 2,924,784. The oscillating loop proper, or tank circuit, is completed by the capacitor 53 connected across the ends of the winding 48, and the entire loop is grounded at 54. It will be noted that the exciting circuit subdivides the winding 48 into an upper minor fraction 46 and a lower major fraction 56.

To energize the exciting circuit, potential is delivered from point 58 through resistor 60 to point 62 and from there through a resistor 64 of low impedance to the collector 40. The same potential from the point 62 is also connected through a resistor 66 of 33,000 ohms to the base 36.

The point 62 is also connected through a capacitor 68 to ground. It will be apparent that the resistor 60 and the capacitor 68 are an RC time-delay circuit tending to control the time-potential curve for the point 62 when the potential is first delivered to the point 58. During the building up of the oscillation, a minor influence on the potential of the point 62 is exerted by the oscillator itself.

The base capacitor 44 is also charging through the following circuits: (1) portion 46 of the inductor winding 48; (2) resistor 50; (3) a split circuit of which one branch is the transistor from emitter to base, and the other branch is the transistor from emitter to collector and resistors 64 and 66; (4) base resistor 42. However, the charging of capacitor 44 is relatively slow and its effect in lowering the potential at point 62 relatively slight, so that the potential of the point 62 rises at a rate determined almost entirely by capacitor 68 and resistor 60. Because of this relationship, there will be one time-potential curve for the collector 40 and a different time-potential curve for the base 36.

When the energy supply to point 58 is interrupted, as by opening the key switch, resistor 60 is left unconnected at its lower end and no longer performs any function. But the charge on capacitor 68 has to find its way to ground at 54 entirely through resistor 64, the transistor, collector to emitter, resistor 50, and the lower major segment 56 of the winding 48. The impedance of this path is much greater than that of resistor 60, and, accordingly, the decay of working potential in the exciting circuit will be relatively slow, and the decay of the oscillation will be much longer than the attack period. Except for abnormally staccato music, this relationship between attack and decay is esthetically preferable.

At the same time that capacitor 68 is discharging, as above outlined, capacitor 44 is discharging through a different network having certain portions in common with the discharge path of capacitor 68. Capacitor 44 discharges through the same path through which it charged during attack, but its time-discharge curve will not be the same as its time-charge curve because the competing potential drop in those portions of its circuit that must also discharge capacitor 68 will be different during attack and during decay. Therefore, during decay, the time-potential curve for the collector and the time-potential curve for the base will be materially different, and neither of them will be the counterpart of the same potentials during attack.

From the point 70 of the oscillator, signal is delivered through resistor 72 to an assembly bus 74 connected to receive signal from all the oscillators. The amplifier unit 22 includes an amplifier proper 76 receiving signal from the bus 74. It may also receive signal from a plurality of additional buses 77, which may be those described in detail in Patent 2,649,006. The amplifier includes player-controlled expression means for varying the gain ratio, which may be according to Patent 2,712,040, operating under the control of the expression control pedal 16.

The amplifier delivers the composite signal from the bus bar 74, after amplification, to a loud-speaker 78. The loud-speaker 78 opens downwardly through an opening in the bottom of the speaker enclosure 80, and the resultant sound issues from the tremolo rotor through sound outlets at 82 and 84 in the organ casing. If the rotor 18 is stationary, a constant tone will be delivered. If the rotor is rotated by means of the motor 84, the Doppler effect described in U.S. Reissue Patent 23,323 will change the constant sound emanating from the loud-speaker to give it a slightly variable frequency, and a slight variation in intensity, with the ultimate effect of a most pleasant and natural vibrato.

VARIABLE PERCUSSION

The prolonged decay, characteristic of chimes, harps, glockenspiels, and instruments of the same general class, is frequently desired only on the solo manual.

Referring to FIGURE 1, point 58 receives potential from any one or more of three key switches, a solo key switch 86, an accompaniment key switch 88, and a pedal key switch 90. Each of these switches is connected to the point 58 through a rectifier diode 92. Thus, when more than one of the key switches 86, 88, and 90 are closed, the switch delivering the greatest potential will control the potential of point 58, so long as that switch remains closed. If the switch of greater potential is opened while a switch of lesser potential is still closed, the amplitude of oscillation will decay back to a lesser intensity, but the oscillator will continue to deliver signal without interruption.

Figure 2:
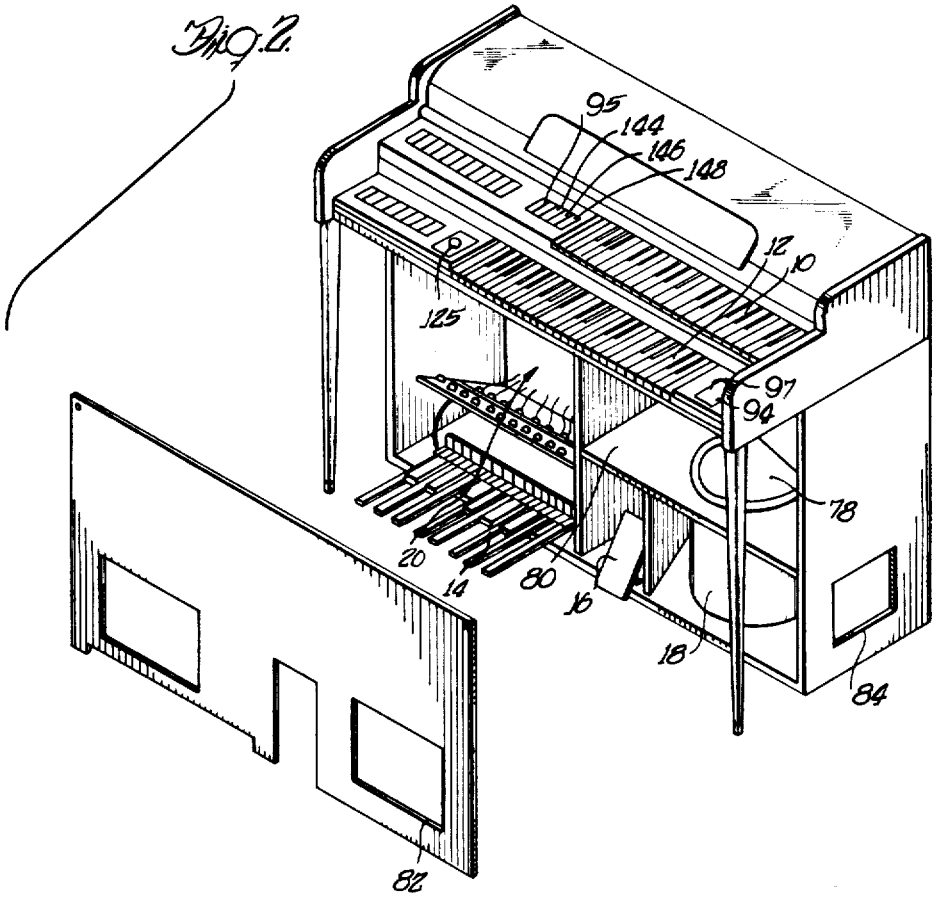
FIGURE 2 is a perspective view of a complete organ with the front panel removed.

Solo key switch 86 is connected through the on-and-off stop switch 94 with the percussion unit 28, as by means of a player-controlled stop element 97 (see FIGURE 2).

Capacitor 98 functions to prolong the decay of the tone, as follows: The charging of capacitor 98 draws current through two circuits. One circuit includes resistor 104 and 106. The other is through the oscillator as follows: Resistor 60, a divided portion from energizing terminal 62 to the emitter 38, resistor 50 and section 56 of winding 48 to ground at 54. The divided portion between 62 and 38 has one path through resistor 66 and the transistor, base, to emitter; and a parallel path through resistor 64 and the transistor, collector to emitter. The impedance of resistor 106 is many times that of the oscillator network, so that nearly all the charging current for the capacitor 98 comes through the oscillator circuit and is therefore effective to prolong the oscillation of the oscillator after the playing key is moved to open position. This continued oscillation is of decreasing amplitude and the tone diminishes accordingly. This diminution of tone is commonly referred to as the decay of the tone.

To enable the player to select a variety of decay rates at will, it would be possible to provide several sets of resistances 106, with a multiple gang switch for each of the sets of resistors, as disclosed in my co-pending application, S.N. 566,446, filed February 20, 1956, now Patent Number 2,924,137. According to the present invention, a single additional set of resistors 108 provides a plurality of different decay rates and at the same time secures an additional desirable esthetic effect.

Associated with the capacitor 98 is another charging circuit effectively in parallel with the oscillator charging circuit. This snubbing circuit is for the purpose of controlling the rate of decay by providing a means for charging capacitor 98 more quickly than would be possible if all the charging current had to come through the oscillator circuit, (plus a minor fraction coming through resistor 106). It is desirable to have the snubbing circuit effective in varying degrees at the will of the operator to control the length of the decay period throughout a range extending from a small fraction of a second up to about three seconds or more.

The snubbing circuit for each oscillator includes a one thousand ohm resistor 108 and a diode 110. These are connected in series with each other and between the snubbing bus 112 and the side of capacitor 98 remote from the keying voltage. The snubbing bus 112 may be connected by the operator to any selected potential available in the power source 30 by means of a selector switch 93.

The selector 93 determines the selected potential for bus 112, and the grounded resistor 106 completes the circuit back to the power pack 30. It will be understood that there are as many percussion units 28, as there are notes for which percussion effects are desired, and that the bus bar 112 is connected to a multiplicity of percussion units.

The keying voltage at 86 may be varied between minus 3 and minus 9 volts and when the key switch is closed, the potential of the conductor 91 will be the keying voltage. When the key switch 86 is moved to open position, this voltage will decrease gradually to zero volts. During most of the time of this decrease, the tone will decrease accordingly, and, shortly before the voltage becomes zero, the oscillator will discontinue oscillation and sound will cease. Assuming a keying voltage of minus 9, if the snubbing bus 112 is also at minus 9 volts, the voltage across diode 110 can never be of polarity to cause the diode to conduct. Under these conditions, the capacitor 98 must charge entirely through the oscillator circuit and through resistor 106, and this will result in a maximum period of attenuation.

However, if the voltage on the snubbing bus is changed to zero, or to a small plus value, the diode will remain conductive until the capacitor 98 is completely charged, and the ordinary decay period will be accelerated in a ratio of about ten to one.

If the voltage of the snubbing bus 112 is made minus six, or minus three, or any negative value less than the keying voltage of minus nine, the diode 110 will remain conductive until the potential of conductor 91 has reached the potential of snubbing bus 112, and the remainder of the decay will take place at the slower rate required by charging through the oscillator and through resistor 106. This results in a total time of decay intermediate between the minimum and the maximum. But this intermediate total decay time will comprise a first portion during which the decay is relatively rapid, and a later portion during which the decay is relatively slow. The two-stage decay characteristic just described is remarkably similar to that of chime bars, or the like, with felt dampers, and to that of a piano when played without the sustain pedal.

Because the pedal tones are played with the foot, there is likely to be a time interval between the time that one pedal key is released and the next one depressed. This frequently causes an undesirable lack of continuity in the music. Because the most advantageous decay period for the pedal notes is usually different from that desired for the solo notes, I provide a separate pedal sustaining capacitor 99 connected in series with resistor 105 and gang switches 95, between ground and the terminal of key switch 90 remote from the power source. Like capacitor 68, capacitor 99 is connected in parallel with the oscillator, whereas capacitor 98 is connected in series. The equivalent snubbing circuit comprises an additional, separate snubbing bus 113 connected through resistor 109 and diode 111 to the conductor 103. It will be obvious that by keeping the snubbing bus 113 at various selected potentials, effects completely analogous with those secured by the snubbing bus 112 are available to the player.

Each of the three time-delay capacitors 68, 98, and 99 can obviously be connected either in series with the oscillator or in parallel with it. The only difference is in the polarity of the capacitor and a capacitor connected in series will be charged when the oscillator is not oscillating and discharged while the oscillator functions, while a capacitor connected in parallel will remain continuously discharged when the oscillator is not oscillating, and be charged when the note is played. I provide also a stop switch 95 for disconnecting capacitor 99 completely, in the same way that stop switch 94 disconnects capacitor 98.

Figure 4:
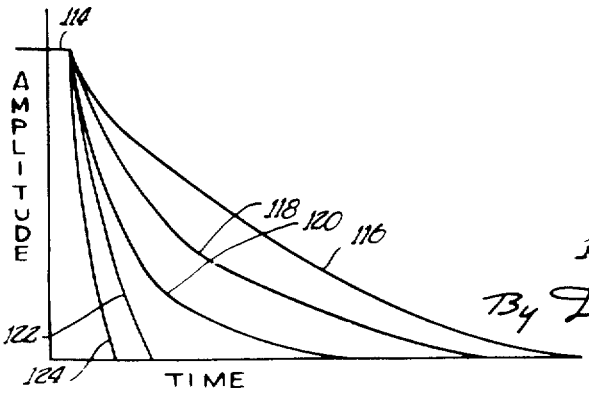
FIGURE 4 is a diagram indicating various decay characteristics.

Referring now to FIGURE 4, the diagram indicates graphically one set of time-volume characteristics that may be at the disposal of the player. Time is shown as a horizontal dimension and amplitude as a vertical, and the horizontal line at 114 indicates the intensity of the sustained note obtained on the solo manual wih a playing voltage of minus nine. The smooth curve 116 indicates the effect when the bus bar 112 is also at minus nine. This produces the esthetic effect of a carillon, or the like.

With the bus bar at minus six volts, a curve results having a relatively steep portion ending at 118 and a less inclined portion from 118 to extinction. This may be made to produce a surprisingly accurate illusion of the effect of an organ played in a very large auditorium, where the auditorium itself creates a reverberation equivalent to the decay indicated. Because the diode 110 changes from conductive to non-conductive over a small voltage range, rather than at a precise voltage, the curve at 118 does not come to a sharp point.

With the bus at minus three, the curve is steep down to a lower intensity at point 120, and then less inclined down to extinction. This effect may be made to coincide with that of a piano played without the sustain pedal in a room of ordinary size.

With the bus bar at a voltage of zero, the result is curve 122, which is almost, but not absolutely, identical with that secured when the gang switch 94 is open, and the percussion unit is not functioning.

With the bus bar at plus one volt, the curve 124 results, and this produces a staccato decay characteristic, which will be rendered more striking with the bus bar at plus three or four volts.

In addition, the bus bar 112 may be in multiple, with the range of the instrument sub-divided between the different bus bars, and an upper octave of oscillators may have one decay characteristic; the next octave a different one, and so on. The following table shows one desirable assortment of values:

| Octave | 1 | 2 | 3 | 4 | 5 | 6 |
|---|---|---|---|---|---|---|
| Percussion Long | −9 | −9 | −9 | −9 | −9 | −9 |
| Percussion Medium | −1 | −1 | −1 | −1 | −1 | −1 |
| Percussion Short | 0 | 0 | 0 | 0 | 0 | 0 |
| Chimes | −9 | −9 | −9 | −9 | −9 | −9 |
| Reverberation Short | plus 3 | plus 3 | plus 3 | plus 3 | plus 3 | plus 3 |
| Reverberation Medium | plus 1 | plus 1 | plus 1 | plus 1 | plus 1 | plus 1 |
| Reverberation Long | 0 | 0 | 0 | 0 | 0 | 0 |
| Piano | −9 | −6 | −3 | −1 | 0 | plus 1 |

These values relate to the duration of the decay period only, and have nothing to do with tone quality, which is controlled in other ways.

In the piano, as in certain other instruments, the lower notes have a longer decay period than the higher ones. The bottom line of the table indicates how these peculiar and desirable tonal characteristics can be closely duplicated electronically.

One set of suitable working values for the components of a transistor oscillator and percussion unit according to the invention is as follows for the note $A_3$ with a frequency of 440 cycles per second.

TABLE OF VALUES

| | |
|---|---|
| Resistor **42** | 0 to 1,000 ohms. |
| Resistance of winding **48** | 48 ohms. |
| Resistor **50** | 220 ohms. |
| Resistor **66** | 33,000 ohms. |
| Resistor **64** | 0 to 1,000 ohms. |
| Resistor **60** | 330 ohms. |
| Capacitor **44** | 5 mfd. |
| Capacitor **53** | 0.95 mfd. |
| Capacitor **68** | 10 mfd. |
| Capacitor **98** | 200 mfd. |
| Capacitor **99** | 200 mfd. |
| Resistors **104** and **105** | 22 ohms. |
| Resistors **108** and **109** | 1,000 ohms. |
| Resistor **106** | 10,000 ohms. |
| Inductance **48, 52** | 0.145 henrys. |

Resistors 42 and 64 are at zero in present practice, but values up to 1,000 ohms can be used at these points to secure variations in attack and decay characteristics.

The values of capacitor 53 and inductance 46, 52 are approximate only. The core 52 is adjustable to secure exact tuning.

In the execution of complicated organ music, and in many other types of expert musical performances, the things that the player needs to accomplish almost instantly by a touch of the foot or finger, include a wide variety of relatively complicated adjustments.

Among the more necessary of such complex adjustments is the adjustment of the relative loudness of the notes played on the solo manual and the notes played on the accompaniment manual and the notes played on the pedal clavier. It will be obvious that the subject matter already disclosed enables an operator to sound one of the relatively low notes with any one or more of the three sets of key switches. At a given instant, such a note may be connected to receive energizing potential through all three switches 86, 88, and 90, and at such an instant the volume will be the relatively high volume due to the relatively high energizing voltage available through the key switch 90. Under such circumstances, if the key switch 90 is opened while the other two switches remain closed, the intensity of the tone will decay back to a lower intensity, which will be the intensity secured by the key switch 86. A fraction of a second later, the key switch 86 may open because the solo air has shifted to another note, whereupon the intensity will decay further to that corresponding to the voltage available from the key 88. And finally, if the key 88 is opened, there will be a different decay characteristic in the dying away of the sound extinction.

This and many other sequences of varying intensity result automatically from mere manipulation of the keys by the operator, so long as a predetermined relative intensity for each of the different sets of key switches is appropriate to the requirement of the musical piece. But, when the operator needs to change from very loud notes on the pedal clavier to notes of normal loudness, or to emphasize a passage played in chords with the key switches 88, while the key switches 86 play a faint obligato, the relative potentials of the different banks of key switches need to be shifted substantially in the flick of an eye-lash.

Figure 5:
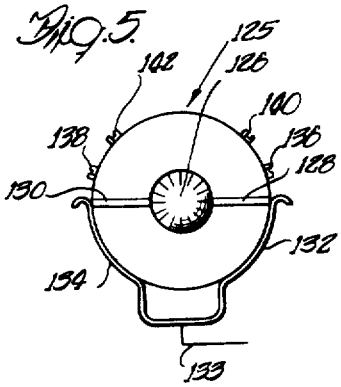
FIGURE 5 is a diagram of a multiple stop switch.

Referring now to FIGURES 2 and 5, I have indicated balancer switch means at 125 comprising a knurled knob 126. A contact member 128 connected to the key switches 86 and another contact member 130 connected to the key switches 88 are indicated as rigid with the knob 126 and rotatable therewith. In the position of FIGURE 5, contact 128 is riding on a sector 132 carrying a potential of minus 9 received from the potential box through a conductor 133 and contact 130 is receiving the same voltage from sector 134 connected to the same conductor 133. On the right side above the sector 132, I provide a short sector 136 carrying a potential of minus 6 and above that a short sector 140 carrying a potential of minus 3. Similarly, on the left side, the first sector above the sector 134 is sector 138 carrying a potential of minus 6 and above that is sector 142 carrying a potential of minus 3.

It will be obvious that counter-clockwise rotation of the button 126 will move contact 128 across from sector 132 to 136, and in a second step from sector 136 to 140. This will reduce the potential of the switch keys 86 in two successive steps while the contact for switch keys 88 merely slides down along the long sector 134 and continues to receive minus 9 volts. Similarly, clockwise rotation of the same button will keep the contact 128 in engagement with the long sector 132 while the contact 130 moves up to receive only minus 6 volts from sector 138 and in a second step to receive only minus 3 volts from sector 142.

I thus provide five different relative intensity ratios between switch keys 86 and 88. In the position of FIGURE 5 keys 86 and 88 deliver the same intensity. Clockwise movement to engage sector 138 will reduce the accompaniment intensity to that resulting from two thirds of the solo manual voltage and further movement to sector 142 will reduce the accompaniment to the intensity resulting from one third of the solo manual voltage, making it seem like a mere background echo. Counter-clockwise rotation to engage sector 136 will relegate the solo air to a background, and movement to sector 140 will make the solo switches 86 deliver a mere echo compared with switches 88.

If this change in ratio were only change in actual volume, the capacity of the instrument would be relatively inadequate. But the foot pedal 16 controls the amplifier 76, and superimposes a total control on the actual loudness of everything that is received by the amplifier, and the expert organist is able to have instant control of changes from one musical passage to the next throughout the entire range necessary for the performance of complicated music.

Because these adjustments of relative intensity originate in the signal from oscillators themselves, it is possible to make a complete and satisfactory musical instrument with a single set of oscillators, whereas it was previously considered necessary to have separate banks of oscillators to secure the same variety in the musical effect.

Finally, the stop switch 97, when closed merely changes the decay rate of the notes played on the pedal clavier, but a touch of the finger enables the player to have four different intensities for the switch keys 90. Besides the stop tablet 95 (see FIGURE 2) is a duplicate stop tablet 144 labeled soft, another tablet 146 labeled medium, and another tablet 148 labeled loud. With all three tablets horizontal and undisturbed, the clavier notes will be as soft as is ever desired when clavier notes are to be played at all. A tap of the finger to tilt up stop 144 will increase this intensity materially and tablets 146 and 148 provide two more steps of increasing intensity. It should be emphasized also that these bass notes are only adjusted in volume as a matter of intensity ratio between them and the notes emanating from the other two key boards, while the merged totality is still controlled to have any acoustic intensity the player desires by means of the swell pedal 16.

The material employed in the core 50 is that disclosed in my co-pending application, S.N. 598,582, filed July 18, 1956, now Patent Number 2,924,784. Many of these ceramic magnet materials are well known in the art, and, per se, form no part of my invention. As distinguished from metallic magnet cores, most of them have the peculiar characteristics required for this service, but only over a minor fraction of their normal range of flux densities, which minor fraction occupies approximately the lower third of the flux density range. By keeping the maximum flux density of the core 52 down within this abnormally low limit, all three of the desired characteristics are made possible.

It has been pointed out that the time-potential curves for the base 36, the emitter 40, and the collector 38 are specifically different from each other during attack, and that during decay a different curve obtains for each of them, the three decay curves being also different from each other. With some of the longer decay periods, the relationship between the three potentials tends to approach an inoperative condition, such that oscillation is interrupted for a very short time, and then resumed. This hiatus sounds like nothing less than an ordinary hiccup, or burp, and would be highly objectionable. Control in this respect is by varying the value of resistor 50. If the value is too low, the burp appears, and if it is too high, the attack becomes sluggish. For this reason, it may be desirable to make the resistor 50 adjustable for ease in manufacture, as by means of the contact adjustment indicated at 51 in FIGURE 1.

Others may readily adapt the invention for use under various conditions of service by employing one or more of the novel features disclosed or equivalents thereof. As at present advised, with respect to the apparent scope of my invention, I desire to claim the following subject matter:

1. In an electronic organ of the type comprising, in combination: a loud speaker; a series of oscillators operatively connected to activate said loud speaker; each oscillator being responsive to D.C. energizing voltage and having a frequency equal to that of a desired musical tone; the amplitude of oscillator response at different energizing voltages being a smooth and continuous function of the energizing voltage, from maximum values substantially down to inaudibility; the amplitude of loud speaker response being a function of the amplitude of oscillator response; the frequency of each oscillator being constant without variation noticeable to the ear, from maximum loudness substantially down to inaudibility; a player-controlled key switch for each oscillator for delivering energizing potential to said oscillator only as long as the player holds the key down; said oscillator being normally not in oscillation during playing of the organ and requiring a time interval to build up its oscillation upon receipt of energizing potential: said time interval for build-up being of the order of magnitude of the attack time for a wind-blown musical instrument; the combination of: a first timing capacitor adapted to be in a selected one of two conditions, charged and discharged; connections rendered operative by changing the position of said key switch for changing the condition of said capacitor to one condition upon closure of said key switch; connections for changing the condition back to the original condition upon opening of said key switch; said first timing capacitor being connected to return to open-key condition, when said key switch is moved from closed to open position, by current in a first circuit passing through said oscillator unit, thus prolonging the decay of said unit; a second, independent circuit for accelerating the restoration of the open-key condition when said key switch is moved from closed to open position; said second circuit maintaining said timing capacitor in open-key condition when said key switch remains in open position; a bus bar; bus connections from said bus bar to one terminal of each of a plurality of said timing capacitors; a diode in each of said bus connections arranged to permit current flow only in the direction to restore open-key condition; resistance in series with each diode for determining the speed with which bus-bar potential restores open-key condition; a first player-controlled stop switch means adapted to remain continuously in any selected position until re-adjusted by the player; and connections between said stop switch means and said bus bar for rendering said bus bar operative or inoperative.

2. A combination according to claim 1 in which said first player-controlled stop switch means includes connections for varying the potential of said bus bar.

3. A combination according to claim 2 in which said first player-controlled stop switch means is in multiple and comprises a multiple-position switch adapted to transmit any one of a plurality of predetermined voltages to said bus bar, and an on-and-off switch controlling the operativeness or inoperativeness of said multiple position switch and said bus bar.

4. A combination according to claim 1 in which said bus bar restores open-key condition more rapidly than current through said oscillator; said bus bar being adjustable to voltages intermediate between playing voltage and zero; whereby, at intermediate bus-bar voltages, the decay is relatively rapid down to an intermediate intensity and then less rapid down to extinction.

5. A combination according to claim 1 in which said oscillator is an LC transistor oscillator employing D.C. voltages up to about 27 volts, and said bus bar is adjustable to D.C. potentials from playing voltage to zero.

6. A combination according to claim 5 in which said bus bar is also adjustable to reversed voltage; whereby the entire decay period can be reduced to a shorter time than the inherent decay rate of the oscillator when used without said timing capacitor.

7. A combination according to claim 1 in which said oscillator unit includes an RC time delay circuit between said key switch and the oscillator proper; said RC delay circuit including a second timing capacitor smaller than said first mentioned timing capacitor; a circuit for changing the condition of said second timing capacitor when said key is moved from open position to closed position over a time interval corresponding to the normal attack period of an acoustical musical instrument of the same frequency; the resistor of said RC delay circuit having an impedance much lower than the oscillator; said second timing capacitor returning to open-key condition by current through said oscillator; whereby said second timing capacitor produces a normal decay period greater than the normal attack period, but less than the decay period obtainable with said first timing capacitor.

8. A combination according to claim 7 in which one of said timing capacitors is connected in parallel with said oscillator and is in charged condition when said playing key is in closed position; and the other of said timing capacitors is connected in series with said oscillator and is in discharged condition when said playing key is in closed position.

9. A combination according to claim 8 in which said second, smaller timing capacitor is connected in parallel with said oscillator and said first, larger capacitor is connected in series.

10. A combination according to claim 2 in which said bus bar is subdivided into a plurality of separate sections; said first player-controlled stop switch means being connected to supply independently predetermined voltages to each of the different sections of said bus bar.

11. A combination according to claim 10 in which the predetermined voltages for the bus bar sections for groups of notes of lower frequency are adjusted to produce longer decay periods than for groups of notes of higher frequency.

12. A combination according to claim 1 in combination with a second player-controlled stop switch means for delivering potentials to said key switches.

13. A combination according to claim 12 in combination with a second duplicate set of key switches; and a third player-controlled stop switch means for delivering different potentials to said second set of key switches.

14. A combination according to claim 13 in which said second and third player controlled stop switch means are mechanically interconnected to permit both sets of key switches to receive the same maximum voltage, or to reduce the voltage for either set but not both.

15. A combination according to claim 13 in combination with a third set of key switches for only a portion of said oscillators of relatively low frequencies; and a fourth player-controlled stop switch means for delivering different potentials to said third set of key switches.

16. A combination according to claim 15 in which each oscillator within the range of said third set of key switches, is provided with a third timing capacitor; and a third timing capacitor circuit controlled by the key switch of said third set of key switches; and a fifth player-controlled stop switch means for rendering said third timing capacitors operative or inoperative.

17. In an electronic organ, in combination: an oscillator characterized by constant frequency over a wide range of amplitudes; a potential source; a first player-controlled key-switch means for initiating and interrupting the delivery of potential from said source to said oscillator; electrical energy storage means adapted to assume a pre-selected one of two conditions, identified as charged and discharged; automatic means for changing the condition of said storage means in one direction when delivery is initiated, and in the opposite direction when delivery is interrupted; said automatic means comprising connections for changing the storage condition as a predetermined function of time by energy direct from said source when delivery is initiated, and connections for changing it back as a different predetermined basic function of time when delivery is interrupted, by energy passing also through said oscillator and activating said oscillator; a second separately controllable player-controlled stop means for speeding up only an initial predetermined portion of the change after interruption, to shorten said basic time function; and translating means for generating musical sound corresponding in intensity to the oscillations of said oscillator.

18. A combination according to claim 17 in combination with a third, separately controllable, player-controlled stop means for varying the size of said predetermined portion of accelerated change.

19. A combination according to claim 18, in which said third player-controlled stop means is a bus bar; accelerated change means connected with said bus bar and activated by the difference between bus bar potential and storage potential; and a player-controlled stop for connecting said bus bar to a selected one of a plurality of different potentials.

20. A combination according to claim 18, in combination with a fourth, separately controllable, player-controlled stop means for adjusting the basic time function after interruption to any selected one of a pluarlity of different values.

21. A combination according to claim 20, in which said fourth stop means is adapted to change the time function by changing the amount of energy stored in said storage means.

*22. In an electronic musical instrument, in combination: a series of signal sources tuned to the notes of the musical scale; each source having a control terminal and being adapted to deliver output signal having an amplitude which is a function of the potential of said terminal; a source of D.C. activating potential; a playing key operatively connected with each control terminal and with said D.C. source, for changing the potential of said terminal from an original inactive potential to full activating potential; electrical energy storage means connected to each control terminal; and a restoring circuit connected to each control terminal for returning said terminal to inactive potential when potential from said D.C. source is withdrawn; said restoring circuit including a decay circuit connected to each control terminal, which normally returns said terminal to inactive potential in a predetermined period of time; and additional means connected to said decay circuit for speeding up the decay down to a predetermined intermediate potential.*

(References on following page)

References Cited in the file of this patent or the original patent

UNITED STATES PATENTS

| | | |
|---|---|---|
| 2,216,513 | Hammond | Oct. 1, 1940 |
| 2,223,080 | Swarbrick | Nov. 26, 1940 |
| 2,285,132 | Weathers et al. | June 2, 1942 |
| 2,296,125 | Traub | Sept. 15, 1942 |
| 2,323,392 | Hammond et al. | July 6, 1943 |
| 2,481,186 | Zuck | Sept. 6, 1949 |

| | | |
|---|---|---|
| 2,600,910 | Nickel | June 17, 1952 |
| 2,710,555 | Martin | June 14, 1955 |
| 2,798,157 | Gruber | July 2, 1957 |
| 2,823,310 | Anderson | Feb. 11, 1958 |
| 2,882,402 | Ireland | Apr. 14, 1959 |
| 2,891,159 | Politi et al. | June 16, 1959 |
| 2,916,958 | Hanert | Dec. 15, 1959 |
| 2,924,137 | Peterson | Feb. 9, 1960 |
| 2,924,784 | Peterson | Feb. 9, 1960 |